United States Patent Office 3,786,007
Patented Jan. 15, 1974

3,786,007
BORAX BORATED POLYMERIC FAT
ACID POLYAMIDES
Paul D. Whyzmuzis, St. Paul, and Clarence W. Wilkus,
New Brighton, Minn., assignors to General Mills
Chemicals, Inc.
No Drawing. Filed Oct. 19, 1972, Ser. No. 298,969
Int. Cl. C08g 20/00
U.S. Cl. 260—18 N                10 Claims

ABSTRACT OF THE DISCLOSURE

Borated polyamides are disclosed which are the reaction of borax with a polymeric fat acid polyamide resin. These borated products are useful as binders for inks, particularly water based printing inks, or other applications where a water-borne film forming vehicle is desired. The polyamide resins employed in the boration are relatively high acid number thermoplastic resins.

FIELD OF INVENTION

This invention relates to borated polymadies, and in particular to borated polymeric fat acid polyamides. The borated products are particularly useful as binders for printing inks, notably water based printing inks and in other coatings. The products also find utility in paper manufacture, textile treatment and generally in application where a water-borne film forming vehicle is desired. The polyamide resins which are borated are relatively high acid number thermoplastic polymeric fat acid polyamides.

BACKGROUND OF INVENTION

Polymeric fat acids and polyamides therefrom are well known. The polyamides are commercially available, in both amine terminated and acid terminated forms. While some of such polyamides resins are used in thermosetting applications with epoxy resin, the solid thermoplastic types, either neutral or slightly acid or amine, have found utility in the part in coatings and inks, particularly flexographic inks, in which the polyamide resin functions as a binder. In the past, inks utilizing the polyamide resins were employed in solutions of organic solvent such as the lower alkanols, i.e, ethanol or propanol. In recent years, with emphasis on minimizing any pollution problems resulting from the use of organic solvents, efforts have been made to use binders which are water soluble, reducible or emulsifiable. In such a way water based inks are employed using lesser amounts of organic solvents, if any.

The unmodified polymeric fat acid polyamides are widely used in inks but find primary utility in organic solvent systems, since their physical characteristics, in being prepared from a fatty acid material, do not readily lend themselves to water systems. In the search for water based ink, some other resins have tended to supplant the polyamide resins as ink resin binders, such as shellac or styrenated shellac products. These, however, while satisfactory for water based inks, do not possess the desirable properties of the polymeric fat acid polyamide products. Accordingly, attempts have been made to modify the polymeric fat acid polyamides to render them satisfactory for use in water based inks.

One modification to increase water solubility was to provide relatively high acid number polyamides, i.e., acid numbers above about 50, the water solubilization of which could be aided by the use of amines or fixed alkalis. While the high carboxyl nature of such polyamide resins tends to favor high solubility, such high acid number resins tend to be somewhat soft and tacky, which tends to provide undesirable film properties. On drying the resins solubilized with amines retain the film properties of the base resin. Fixed alkalis remain in the film and generally result in film having reduced alcohol and water resistance. In addition, the high acid number resins tend to exhibit cold flow and powders or granules thereof, the form in which such resins are usually sold, tend to form lumps or cake up.

BRIEF SUMMARY OF INVENTION

It has now been found that high acid number polymeric fat acid polyamides may be borated with borax. The use of borax, in addition to minimizing or eliminating any tendency to cold flow, provides films of equal or improved hardness, similar water resistance and generally improve alcohol and heat resistance. Thus, the boration tends to show improvement in one or more of the foregoing characteristics, dependent on the particular nature of the base resin. These resins find utility in applications where it is desirable to provide harder resin films and improved alcohol or heat resistance. Additionally, use of borax allows many of the high acid polyamide resins to be dispersed in water to give low viscosity aqueous vehicles. Accordingly, those which are dispersible in aqueous vehicles, find particular utility as a water based ink resin.

DETAILED DESCRIPTION OF INVENTION

As indicated the thermoplastic, solid polymeric fat acid polyamides having relatively high acid numbers are borated with borax, i.e., sodium borate decahydrate,

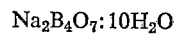

$$Na_2B_4O_7 : 10H_2O$$

The boration is accomplished by reacting the borax with the polyamide resin. The reaction may be conducted at room temperature, i.e., about 23° C. or at elevated temperatures up to about 225° C. Where elevated temperatures are employed, the most desirable temperature is about 180° C. with a generally desirable range of about 160° C. to 200° C. The borax is generally added to the polyamide as a hot aqueous solution, having a borax concentration of about 20 to 33% by weight. Good results are achieved at a water to borax ratio of 2:1. The borax can be added to the resin for reaction at the end of the polyamide reaction, or subsequently, at the time of preparation of the solution or emulsion. The amount of borax used can range from 0.1 to 1.0 mole of borax per equivalent of acid resin, with about 0.2 to 0.6 mole of borax per equivalent of acid resin being preferred. At these levels, resins are provided with higher melting points and less tendency to cold flow.

As indicated, the resins to be borated are solid, thermoplastic polymeric fat acid polyamide resins having relatively high acid numbers, which is achieved by using a stoichiometric excess of acid over amine to provide the desired acid number. This invention does not involve the base polyamide resins, per se, as such resins are well known and/or commercially available. For the purposes of this invention the resins to be borated are those having acid numbers of at least 50. The more desirable resins have acid numbers in the range of about 50–150. In general, such acid numbers are achieved by employing amine in an amount of about 25–75% of the total carboxyl equivalents employed. While higher acid number products can be borated and will provide for more water solubility, the films of the products when borated tend to be less resistant to solvents and water. By acid number is meant the number of milligrams of KOH equivalent to the free carboxyl groups present in one gram of resin. Correspondingly, the amine number, where designated, is defined as the number of milligrams of KOH equivalent to the free amine groups present in one gram of resin. Thus the acid number or amine number is an indication of the respective unreacted free carboxyl or amine groups present in the resins.

The preparation of the polyamides of polymeric fat acids is old and well known as can be seen from U.S. Pats.

2,379,413 and 2,450,940. In general, the resins are preferably prepared by reaction of an acid component and amine component in the temperature range of about 100–300° C. accompanied by removal of any by-product water, or alcohol if the amide forming esters of the acids are employed instead of the acids per se. The reaction is preferably carried out at about 200–250° C. The time of reaction may also be varied widely and will depend somewhat on temperature. Normally a time period of about ½ to 8 hours after reaching the selected temperature is required. The preferred time of reaction is about 3 hours. A typical set of reaction conditions is 225° C. for a period of 3 hours. Vacuum may be applied if desired to withdraw volatile by-products and to keep the resin mixture from contact with air which may cause darkening. An inert gas may also be employed to avoid contact with air.

As can be seen from the patents noted, the acid component may comprise the polymeric fat acid above or mixtures thereof with other carboxylic reactants including monocarboxylic acids and dicarboxylic acids. The amine component may comprise a single diamine or polyamine or mixtures thereof. The amine component may also include other amine reactants such as alkanol amines which form polyester amides.

Polymeric fat acids are commercially available products. A description of these acids and their method of preparation may be found in U.S. Pat. 3,157,681 which disclosure is incorporated herein by reference. As indicated in this patent, polymeric fat acids result from the polymerization of saturated, ethylenically unsaturated or acetylenically unsaturated naturally occurring or synthetic monocarboxylic aliphatic acids contains from 8 to 24 carbon atoms, preferably 16–20 carbon atoms. Commercially the 18 carbon atom monocarboxylic acids such as oleic, linoleic, linolenic and eleostearic acids are employed as starting materials for the preparation of the polymeric fat acids. Tall oil fatty acids, which are predominantly a mixture of oleic and linoleic acids, is the most common starting material.

After polymerization with or without a catalyst, the resulting product is a mixture of predominantly dimeric fat acids, some trimeric and higher polymeric fat acids and some unpolymerized monomeric fat acids. Commercially available polymeric fat acids polymerized tall oil fatty acids will have a dimeric fat acid content of about 60–80% by weight, a trimeric and higher polymeric fat acid content of about 10 to 35%, and a monomeric fat acid content of about 5 to 20% by weight.

Reference has been made above to the monomeric, dimeric and trimeric fat acids present in the polymeric fat acids. The amounts of monomeric fat acids, often referred to as monomer (M), dimeric fat acids, often referred to as trimer (T), may be determined analytically by a micromolecular distillation analytical method such as Paschke, R. F., et al., J. Am. Oil Chem. Soc. XXXI No. 1, 5, (1954) wherein the distillation is carried out under high vacuum (below 5 microns) and the monomeric fraction is calculated from the weight of product distilling at 155° C., the dimeric fraction is calculated from that distilling between 155° C. and 250° C. and the trimeric (or higher) fraction is calculated based on residue. Unless otherwise indicated, this analytical method was employed in the analysis of the polymeric fat acids employed herein.

The polymeric fat acids may be fractionated to provide products having higher dimer contents, by conventional distillation, or solvent extraction techniques may be employed therefor. They may also be hydrogenated (before or after distillation) to reduce unsaturation, under hydrogen pressure in the presence of a hydrogenation catalyst. It is also understood that such other derivatives of polymeric fat acids, or other co-acids, which are capable of forming amides in reaction with a diamine, such as the lower alcohol (1–8 carbon atoms) esters of the acids may be employed in place of the acids themselves in which the by-product is then a lower alcohol rather than water.

As indicated earlier, other carboxylic compounds may be employed along with the polymeric fat acids. Among these are aliphatic monocarboxylic acids such as those of the formula RCOOH, where R is hydrogen or an aliphatic hydrocarbon radical having from 1 to 23 carbon atoms. Acids contemplated within the scope of this invention are formic acid, acetic acid, propionic acid, isobutyric acid, n-butyric acid, hexoic acid, 2-ethyl hexoic acid, iso-octanoic acid, abietic acid (rosin acid) and the higher fatty acids such as those from which polymeric fat acids are derived, preferably those containing 18 carbon atoms, such as oleic, linoleic, linolenic and monomeric tall oil acids which consist of a substantially equal mixture by weight of oleic and linoleic acids. R may accordingly be straight or branched chained.

The rosin acid is preferably used in the form of an adduct with an aliphatic, unsaturated dicarboxylic anhydride or acids such as maleic anhydride, maleic acid, fumaric acid or mixtures thereof. Such adducts are referred to herein as "a maleated rosin acid."

The adduct, a maleated rosin acid, can contain from about 1 to 2 equivalents of the unsaturated aliphatic dicarboxylic acid anhydride to 1 equivalent of the rosin acid. Preferably the mole ratio is about one to one. A typical commercially available rosin acid-maleic anhydride adduct is commercially sold under the trademark "Arochem® 404" by Ashland Chemical Co. Another commercially available rosin acid product suitable as a co-acid is the pentaerythritol ester of maleated rosin sold under the trademark Pentalyn® 255.

In general, the maleated rosin acid is made by heating with agitation a mixture of rosin acid and the unsaturated dicarboxylic acid or anhydride to a temperature of about 130° C. to 250° C. The heated mixture is held at that temperature for about one half hour to three hours.

In addition, other co-acids (dicarboxylic) alone or mixtures thereof may optionally be employed. Such co-acids may be ideally represented by the formula $$HOOC—R'—COOH$$

where R' is an aliphatic, cycloaliphatic or aromatic hydrocarbon radical having from 2 to about 20 carbon atoms, preferably 4–10 carbon atoms. Illustrative of such acids are malonic, succinic, glutaric, adipic, pimelic, suberic, azelaic, sebacic, dodecanedioic, phthalic, isophathalic, and terephthalic acids.

The amine component comprises a polyfunctional amine such as a diamine or polyamine, or mixtures thereof. As can be seen from U.S. Pat. 2,379,413, this includes the alkylene diamines, such as ethylene diamine, tetramethylene diamine, pentaethylene diamine, hexamethylene diamine, octamethylene diamine, decamethylene diamine and the corresponding polyalkylene polyamines such as diethylene triamine, bis(hexamethylene) triamine, di-1,3-propane triamine, di-1,2-propane triamine, triethylene tetramine and tetraethylene pentamine. The alkyl substituted diamines can also be employed such as 3-methyl hexamethylene diamine or trimethyl hexamethylene diamine. As seen in the patent, aromatic and cycloaliphatic amines may also be employed such as xylylene diamine or piperazine. Polymeric fat acid polyamides of amines such as isophorone diamine, cyclohexanebis(methylamine), cyclohexylene diamine, bis(aminoethyl) benzene and methylene dianiline are also known. Generally the amine may be represented by the following formula $$H_2NR''(NHR'')_nNH_2$$

where R" is an aliphatic, cycloaliphatic or aromatic hydrocarbon radical having from 2 to 10 carbon atoms and n is an integer of from 0 to 5. The preferred amines are the alkylene diamines or polyamines, wherein R" is an alkylene radical having from 2–6 carbon atoms.

This invention can best be further illustrated by the following examples and embodiments. All parts and percentages are by weight unless otherwise noted.

EXAMPLE I

A series of resins having an acid number of at least 50 were prepared from the reactants noted later below. In preparing the resins, all the reactants were charged to the reaction vessel and then heated under nitrogen to 140° C. and held for 30 minutes. The temperature was then raised to 225° C. and held for 30 minutes. Vacuum (about 10 mm. Hg) was then applied for 5-10 minutes. The product was then cooled to 200° C. and after breaking the vacuum with nitrogen the product was discharged.

The resulting products were then borated by reaction with borax. In this reaction the resin was held at 225° C. under vacuum (about 10 mm. Hg) for 10-15 minutes. The reaction was then cooled to 180° C., vacuum broken with nitrogen, and a solution of borax and water (premixed at 60° C. with a water to borax ratio of 2:1) was added, using the desired amount of borax. The reactants were mixed to homogeneity as an opaque semipaste for 0.5 hour and the temperature permitted to drop to 100-115° C. The reaction mixture was then heated to 225° C. with vacuum applied at 180° C. and held for 10 minutes at 225° C. The product was then discharged.

The details of the preparation of the base resins and properties thereof can be seen from Table I below. In the table, the maleated rosin acid employed was Arochem 404, unless otherwise noted. In the preparations, three different lots of polymeric fat acids (polymerized tall oil fatty acids) were employed, having the following analysis:

Acid A (percent):
　M=0
　D=40
　T=60
Acid B (percent):
　M=13
　D=74
　T=13
Acid C (percent):
　M=80
　D=20
　T=0

Other acids employed in preparing the resins are identified as follows:

MA=Monomeric tall oil fatty acids
AD=Adipic acid
AZ=Azelaic acid
IA=Isophthalic acid In the amine component, various amines were employed which are identified as follows:

EDA=Ethylene diamine
HMDA=Hexamethylene diamine
DETA=Diethylene triamine
TETA=Triethylene tetramine
IPDA=Isophorone diamine
BHTA=Bis(hexamethylene)triamine

| | Acids eq. | | | | | | Resin properties | |
|---|---|---|---|---|---|---|---|---|
| | Polymeric fat acid | | Other acid | | Maleated rosin acid eq. | Amine | | Softening point, °C.[1] |
| Ex. | Eq. | Type | Eq. | Type | | Eq. | Type | Acid No. | |
| 1 | 23.5 | A | 9.3 / 13.6 | MA / AD | 53.6 | 48.0 | BHTA | 100 | 98 |
| 2 | 21.6 | A | 8.5 / 12.5 | MA / AD | 57.4 | 49.0 | BHTA | 102 | 118 |
| 3 | 29.7 | A | 9.3 | MA | 61.0 | 50.0 | EDA | 81 | 116 |
| 4 | 29.7 | B | 9.3 | MA | 61.0 | 50 | EDA | 85 | 90 |
| 5 | 23.5 | A | 9.3 / 13.6 | MA / AZ | 53.6 | 53.6 | BHTA | 96 | 97 |
| 6 | 25.0 / 25.0 | A / B | 25.0 | AD | 25.0 | 65.0 | EDA | 50 | 101 |
| 7 | 25.0 / 10.0 | A / B | 20.0 / 15.0 | AZ / IA | 30.0 | 64.0 | EDA | 92 | 98 |
| 8 | 24.8 | A | 8.0 | AD | 67.2 | 67.2 | EDA | 82 | 130 |
| 9 | 28.3 | A | 9.2 | AD | [2] 62.5 | 67.2 | EDA | 69 | 133 |
| 10 | 24.8 | A | 8.0 | AD | 67.2 | 33.6 | EDA | 149 | 116 |
| 11 | 21.6 | A | 8.5 / 12.5 | MA / AD | 57.4 | 49.0 | DETA | 99 | 116 |
| 12 | 21.6 | A | 8.5 / 12.5 | MA / AD | 57.4 | 49.0 | TETA | 106 | 114 |
| 13 | 21.6 | A | 8.5 / 12.5 | MA / AD | 57.4 | 49.0 | IPDA | 100 | 130 |
| 14 | 27.9 | A | 11.0 / 16.1 | MA / AD | 45.0 | 49.0 | EDA | 102 | 90 |
| 15 | 15.2 | A | 6.0 / 8.8 | MA / AD | 70.0 | 49.0 | EDA | 108 | 119 |
| 16 | 19.8 | A | 7.8 / 20.0 | MA / AD | 52.4 | 49.0 | EDA | 109 | 100 |
| 17 | 21.6 | A | 8.5 / 12.5 | MA / AD | 57.4 | 49.0 | HMDA | 104 | 98 |
| 18 | 25.0 / 25.0 | A / B | 25.0 | AD | 25.0 | 75.0 | EDA | 56 | 134 |
| 19 | 25.0 / 25.0 | A / C | 50.0 | IA | ---------- | 60.0 | IPDA | 89 | 10[1] |
| 20 | 100.0 | B | ---------- | ---------- | ---------- | 74.0 | EDA | 50 | Tacky |
| 21 | 75.0 | B | 25.0 | IA | ---------- | 54.0 | IPDA | 81 | Tacky |
| 22 | 50.0 | B | 50.0 | IA | ---------- | 60.0 | IPDA | 89 | 110 |
| 23 | 17.0 | B | 25.5 | AD | 57.5 | 51.8 | BHTA | 101 | 125 |

[1] Ball and Ring—ASTM E 28-58T.
[2] Pentaerythritol ester of maleated rosin acid, typical acid value 194. Available from Hercules Chemical.

After boration the film properties of the products were evaluated both on the base resin, as is, and the borated products. The films were 3 mil wet films applied to metal panels. The base resin films were formed from a 30% non-volatile solution in 95% n-propanol. The borated products films were formed from a 30% total solids in 50/50 n-propanol and water. The films were then evaluated for Sward Rocker hardness, ethanol and water resistance and stick temperature. For the ethanol and water resistance tests, the films were rubbed with moderate finger pressure for 25 rubs. In the table below, ten is a score showing no effect. Lower values show degree of removal of film down to all removed (a score of 0). In water resistance, the borated products were all equal to the base resin, a score of ten. Stick temperatures indicate the temperature at which an 8 gm. weight (40 g./sq. in.) sticks to the film. In the products evaluated, the borated products of Examples 1, 2, 5, 7, 14, 16, 17 and 19 were dispersible or emulsifiable in water, illustrating products preferred for water based applications. In the following Table II, the level of borax boration is also indicated in moles of borax per equivalent (eq.) of acid.

TABLE II

| | | Film properties | | | | | |
|---|---|---|---|---|---|---|---|
| | | Sward Rocker hardness | | Ethanol resistance | | Stick temp., °C. | |
| Ex. No. | Borax level | As is | Borated | As is | Borated | As is | Borated |
| 1 | 0.30 | 25 | 28 | 0 | 5 | 86 | 110 |
| 2 | 0.29 | 26 | 35 | 0 | 2 | 86 | 110 |
| 3 | 0.37 | 32 | 30 | 0 | 5 | 94 | 140+ |
| 4 | 0.35 | 30 | 33 | 0 | 2 | 86 | 94 |
| 5 | 0.31 | 28 | 28 | 0 | 10 | 86 | 140 |
| 6 | 0.59 | 16 | 26 | 0 | 10 | 86 | 140+ |
| 7 | 0.32 | 32 | 32 | 0 | 2 | 86 | 140+ |
| 8 | 0.36 | 47 | 30 | 0 | 10 | 140 | 140+ |
| 9 | 0.43 | 37 | 46 | 0 | 10 | 125 | 140+ |
| 10 | 0.20 | 39 | 16 | 0 | 5 | 140 | 140 |
| 11 | 0.30 | 25 | 33 | 0 | 8 | | |
| 12 | 0.28 | 39 | 46 | 10 | 10 | 110 | 125 |
| 13 | 0.30 | 49 | 53 | 0 | 10 | 110 | 125 |
| 14 | 0.29 | 14 | 23 | 0 | 10 | 86 | 110 |
| 15 | 0.28 | 32 | 39 | 0 | 10 | | |
| 16 | 0.27 | 21 | 23 | 0 | 2 | | |
| 17 | 0.29 | 26 | 35 | 0 | 0 | | |
| 18 | 0.53 | 14 | 14 | 0 | 3 | 94 | 110 |
| 19 | 0.30 | 23 | 30 | 0 | 5 | 86 | 86 |
| 20 | 0.59 | Tacky | 18 | 0 | 1 | | |
| 21 | 0.33 | Tacky | 32 | 0 | 0 | | |
| 22 | 0.33 | 32 | 37 | 0 | 2 | 86 | 140+ |
| 23 | | Not determined | | | | | |

EXAMPLE II

As earlier discussed, one method of the past in aiding water solubility of relatively high acid number polyamides was through the use of alkali such as the alkali metal hydroxides. However, the use of such alkali generally provided deteriorated film properties particularly in reduced ethanol and water resistance. In the case of the borated products of the present invention, alkali may be used therewith to further aid water solubility. The use of such alkali, as NaOH, while showing some reduction in ethanol resistance was found to retain the water resistance of the borated product with some improvement in hardness.

This can be shown by boration of the base resin of Example 2 above using the same method as described in Example I. The boration with 0.15 mole of borax per equivalent of acid provided a product having the following film properties:

Sward hardness _____ 53
Ethanol resistance _____ 10
Water resistance _____ 10

Using 0.28 mole of NaOH per equivalent of acid with the above product and evaluating the film properties thereof, it was found that the water resistance was retained at 10, the hardness was increased to 58 while the ethanol resistance was only lowered to a figure of 8.

In view of the foregoing, it is apparent that where additional water solubility is desired, alkali such as the alkali metal hydroxides may be employed with the borated products. The alkali, such as sodium hydroxide may be employed up to about 0.3 mole of alkali per equivalent of acid.

Example III

In the examples above, the maleated rosin acid employed was a commercially available product. As indicated earlier, a maleated rosin acid product can be prepared by first reacting the rosin acid and anhydride, such as maleic anhydride, with subsequent addition and reaction of the remaining reactants. This example will serve to illustrate this method of preparation of the resin, using the reactants as indicated:

| | Eq. |
|---|---|
| Tall oil rosin acids | 0.228 |
| Maleic anhydride | 0.204 |
| Polymeric fat acid A of Example I | 0.190 |
| Monomeric tall oil fatty acids | 0.025 |
| Adipic acid | 0.110 |
| Bis(hexamethylene)triamine | 0.433 |

The maleic anhydride and rosin acid were charged to the reaction vessel and heated carefully to 200° C. with stirring under nitrogen. The reaction mixture was held at 200° C. for 1 hour. The remaining acid reactants were added with stirring. The reaction mixture was cooled to about 90° C. and the triamine added. The reaction mixture was then heated to 140° C. and held at this temperature for 30 minutes. The temperature was then raised to 225° C. and held for 30 minutes under nitrogen. Vacuum (about 10 mm. Hg) was applied for 5 minutes. The mixture was then cooled to 200° C., the vacuum was broken with nitrogen and the product discharged. The product had an acid value of 97 and a Ball and Ring softening point of 95° C.

The resin may be borated by reaction with an aqueous solution of borax with agitation at room temperature. Upon agitation some rise in temperature is noted indicating reaction of the borax with the resin. Where the product is to be employed as a water based ink resin, an ink varnish may be prepared at the time of boration by including the components of the varnish. Thus 25 parts by weight of the polyamide resin may be borated with 5 parts of borax by agitation in 59.5 parts of water, 10 parts of n-propanol with 0.5 part of sodium hydroxide. An ink may be prepared by grinding pigment into the varnish. Such an ink will possess almost instant drying speed as can be seen by drawing down a film of the ink on Kraft paper and then subjecting the sample to hot tap water. In about 4 seconds after laying down of the film, the ink film will be unaltered on exposure to the hot tap water.

As can be seen from the foregoing, the borax treated resins provide many advantageous properties. The amount of borax employed for boration is from about 0.1 to 1.0 mole of borax per equivalent of the acid resin with about 0.2–0.6 being preferred. The resins to be borated are relatively high acid number polymeric fat acid polyamide resins, i.e., acid numbers of at least about 50. Such acid numbers are achieved by employing the amine component in an amount of about 25–75% of the total carboxyl equivalents employed in preparing the resin. The acid component, on a 100 equivalent percent carboxyl, can desirably be represented as:

| | Eq. percent |
|---|---|
| Polymeric fat acid | 15–100 |
| Monocarboxylic acid | 0–15 |
| Co-dicarboxylic acid | 0–30 |
| Maleated rosin acid | 0–75 |

The more preferred resins, particularly where water dispersability or emulsifiability are desired, are those including a maleated rosin acid reactant in the acid component and employing bis(hexamethylene)triamine as the amine component. Such resins may ideally be represented as:

| | Equivalent percent | |
|---|---|---|
| | Preferred range | Approx. optimum |
| Acid component: | | |
| Polymeric fat acid | 15–30 | 15 |
| Monomeric fat acid | 0–10 | 3 |
| Co-dicarboxylic acid | 10–30 | 25 |
| Maleated rosin acid | 45–65 | 57 |
| Amine component: Bis(hexamethylene)triamine | 45–55 | 52 |

Where the resin is to be employed in an aqueous ink varnish, the boration may be conducted at the time of forming the varnish by employing water in an amount sufficient to provide the desired concentration of borated resin. The reaction is carried out at room temperature with agitation. Alternately, the boration may be conducted with a smaller amount of water and water added subsequently to provide the desired concentration. If alkali is to be employed for additional water solubility, it may be added at this time. Varnishes for use in inks will generally provide concentrations of up to about 30% by weight of borated resin in water. To form an ink, it is then merely necessary to grind the desired pigment into the varnish. An ink formulation with the present borated resins will preferably be as follows:

| Component: | Amount, percent by weight |
|---|---|
| Borated resin | 20 to 18 |
| Water | 72 to 57 |
| Pigment (organic type) | 8 to 25 |

Other optional ingredients may be added to provide optional characteristics. As indicated, added alkali for additional water solubility can be added in an amount of up to about 0.3 mole of alkali per equivalent of acid in the resin or on a weight basis in an amount of up to 0.5% by weight based on total weight of varnish (borated resin plus water). Other conventional ink modifiers where employed will generally be employed in an amount of about 3–7% by weight based on total ink composition. Illustrative of some conventional modifiers are phenolic resins, waxes, plasticizers and nitrocellulose.

Small amounts of organic solvents may also be present in the water, up to about 10% by weight based on total ink composition. The solvents preferably are alcohols such as ethanol, isopropanol or n-propanol. Unsaturated alcohols such as methyl butynol may also be employed. Mixture of solvents may also be employed such as a mixture of isopropanol and isopropyl acetate. The alcohol solvents may also be blended with small amounts of aliphatic hydrocarbons such as hexane or low boiling naphthas if compatible in solution. The pigments are conventional ink pigments, the particular pigment employed being dependent on the particular opacity, tinting strength, and color desired. Illustrative of some suitable pigments are rutile titanium dioxide, carbon black, iron oxide, chrome yellow, phthalocyanine blue, phthalocyanine green, chrome orange, molybdate orange, and toluidine red.

The embodiments of the invention in which an exclusive property or privilege is claimed are defined as follows:

1. A borax borated polymeric fat acid polyamide resin, said polyamide resin having an acid number of at least about 50 prior to boration, said borax being employed in an amount of from about 0.1 to 1.0 mole of borax per equivalent of acid in said resin.

2. A borated product as defined in claim 1 wherein said polyamide resin is the reaction product at temperatures of about 100–300° C. of:
 (A) 100 carboxy equivalent percent of an acid component comprising:
  (1) about 15–100 equivalent percent of a polymeric fat acid
  (2) up to about 15 equivalent percent of at least one monocarboxylic acid
  (3) up to about 30 equivalent percent of at least one other dicarboxylic acid and
  (4) up to about 75 equivalent percent of a maleated rosin acid
with (B) 25–75 amine equivalent percent of a polyfunctional amine having the formula $$H_2NR''(NHR'')_nNH_2$$

where $R''$ is an aliphatic, cycloaliphatic or aromatic hydrocarbon radical having from 2 to 10 carbon atoms and $n$ is an integer fo 0 to 5.

3. A borated product as defined in claim 2 wherein said polymeric fat acid (1) is a polymeric fat acid of a monocarboxylic aliphatic acid containing from 8 to 24 carbon atoms, said monocarboxylic acid (2) has the formula RCOOH where R is hydrogen or an aliphatic hydrocarbon radical having from 1–23 carbon atoms, said dicarboxylic acid (3) has the formula HOOC—R'—COOH where $R'$ is an aliphatic, cycloaliphatic or aromatic hydrocarbon radical having from 2 to 20 carbon atoms and said polyfunctional amine has the formula $$H_2NR''(NHR'')_nNH_2$$

where $R''$ is an aliphatic, cycloaliphatic or aromatic hydrocarbon radical having from 2–10 carbon atoms and $n$ is an integer from 0 to 5.

4. A borated product as defined in claim 3 wherein said polymeric fat acid is a polymeric fat acid of a monocarboxylic aliphatic acid having 18 carbon atoms, R is a straight chain aliphatic hydrocarbon radical having 17 carbon atoms, $R'$ has from 4–10 carbon atoms and $R''$ is a divalent alkylene radical having from 2–6 carbon atoms.

5. A borated product as defined in claim 2 wherein said polymeric fat acid (1) is polymerized tall oil fatty acids, said monocarboxylic acids (2) is monomeric tall oil fatty acids, said dicarboxylic acid (3) is selected from the group consisting of adipic acid, azelaic acid and isophthalic acid or mixtures thereof, said maleated rosin acid (4) is an adduct of rosin acid and maleic anhydride and said polyfunctional amine is selected from the group consisting of ethylene diamine, hexamethylene diamine, diethylene triamine, bis(hexamethylene)triamine, triethylene tetramine and isophorone diamine.

6. A borated product as defined in claim 2 wherein said polymeric fat acid is employed in an amount of 15–30 equivalent percent, said monocarboxylic acid is employed in an amount of 0–10 equivalent percent, said dicarboxylic acid is employed in an amount of 10–30 equivalent percent, said maleated rosin acid is employed in an amount of 45–55 equivalent percent and said polyfunctional amine is bis(hexamethylene)triamine employed in an amount of 45–55 amine equivalent percent.

7. A borated product as defined in claim 1 wherein said resin has an acid number of about 50–150 and said borax is employed in an amount of from about 0.2 to 0.6 mole of borax per equivalent of acid in said resin.

8. An aqueous solution of the borax treated polymeric fat acid polyamide resin defined in claim 1.

9. An aqueous solution as defined in claim 8 wherein said borax is employed in an amount of from about 0.2 to 0.6 mole of borax per equivalent of acid in said resin.

10. An aqueous solution as defined in claim 9 wherein said solution further comprises up to about 0.3 mole of an alkali per equivalent of acid in said resin.

References Cited
UNITED STATES PATENTS

| | | | |
|---|---|---|---|
| 3,214,400 | 10/1965 | Silver | 260—29.2 |
| 3,218,279 | 11/1965 | Stalego | 260—29.3 |
| 3,481,764 | 12/1969 | Matsumoto et al. | 117—155 |
| 3,426,096 | 2/1969 | Anderson | 260—75 |

DONALD E. CZAJA, Primary Examiner

E. C. RZUCIDLO, Assistant Examiner

U.S. Cl. X.R.

106—27; 260—24, 29.2 N, 404.5